United States Patent [19]

Milevski

[11] 4,325,745

[45] Apr. 20, 1982

[54] PAINT REPELLENT COMPOSITION AND METHOD

[76] Inventor: Tome Milevski, 267 E. Burlington St., Riverside, Ill. 60546

[21] Appl. No.: 231,827

[22] Filed: Feb. 5, 1981

[51] Int. Cl.$^3$ .......................... C03C 23/00; C09D 5/20
[52] U.S. Cl. ........................................... 134/4; 134/38; 106/2; 427/154; 98/115 SB
[58] Field of Search ..................... 106/2; 427/154–156; 134/4, 38; 98/115 SB

[56] References Cited

U.S. PATENT DOCUMENTS 3,470,001 9/1969 Koury ..................................... 106/2
3,476,575 11/1969 Arnold ................................... 106/2

*Primary Examiner*—Sam Silverberg
*Attorney, Agent, or Firm*—Eugene M. Bond; Dushan Zdravkovich

[57] ABSTRACT

The invention disclosed provides a new improved paint repellent composition and method of using same such as, for example, a coating in a spray booth. In particular, the present paint repellent composition includes a mixture of hydrocarbon oils, sodium chloride, sugar, aluminum silicate, sand and acetic acid and when applied to a substrate effectively repels paint.

4 Claims, No Drawings

PAINT REPELLENT COMPOSITION AND METHOD

FIELD OF THE INVENTION

The present invention relates to a paint repellent composition which includes a mixture of hydrocarbon oils, sodium chloride, sugar, aluminum silicate, sand and acetic acid.

The method of the present invention provides a paint repellent composition which is blended and applied to a substrate such as a spray booth or the like. When paint is applied onto the paint repellent composition, it may be readily removed such as by application of water under pressure.

BACKGROUND OF THE INVENTION

Prior to this invention, a number of techniques have been applied to eliminate the tacky characteristics and agglomeration tendencies of the spray particles. A variety of attempted solutions are described in U.S. Pat. Nos. 2,739,903 and 2,968,638. Usually, a paint booth compound containing various alkalis, wetting agents, absorbents, defoamers, and the like are dissolved in the water of a water wash booth system in concentrations sufficient to react with the surface of the paint particles to reduce its tackiness. As the concentration of paint in the system increases, it is usually necessary to add increasing concentrations of these agents in order to speed up the surface reaction with the paint particles and prevent agglomeration and sinking of the paint to the bottom of the sumps in the recirculating system.

It has been necessary, especially in the automotive industry and the appliance industry to provide separate shelter areas when spray painting various objects such as auto body parts, appliances, sheet metal and other miscellaneous parts, called "spray booths".

When the article is sprayed with the paint or finish, a large quantity of paint is deposited upon the surfaces of the side, floor and ceiling. When this deposit has become of a certain thickness the spray booth then becomes a very serious fire hazard, and it is necessary to remove the accumulations.

It has been well known in the art for a number of years to coat the side of the spray booth with a preparation which will permit a quick and easy removal of the accumulations from the surfaces.

These coatings must provide the following properties:

(1) The material must be easily and quickly removable, carrying with it the accumulation of paint or finish.

(2) It must provide a tacky surface to cut excess paint and other airborne particles such as dust to eliminate rejects.

(3) It must possess a light reflective surface to afford the painter optimum visibility to apply paints especially metallic paints evenly and correctly.

To date, no product is available which combines all these properties.

It has now been found that by practice of the present invention, there is provided a new, highly efficient relatively inexpensive method and paint repellent composition which overcomes numerous disadvantages of those related compositions known to the art.

SUMMARY OF THE INVENTION

Generally stated, the present invention provides a method and a new, improved paint repellent composition which includes a mixture of hydrocarbon oils, sodium chloride, sugar, aluminum silicate, sand and acetic acid.

In the method of the present invention, the present paint repellent composition is blended and applied to a substrate prior to application of paint. Thereafter, the paint repellent composition with paint disposed thereon may be readily removed by any of a number of simple means such as by application of water under pressure.

It is an object of this invention to provide a new, economical and highly efficient paint repellent composition.

It is also an object of this invention to provide a method for effectively retarding paint from sticking to a substrate such as a spray booth.

It is yet another object of this invention to provide a new, improved paint repellent composition which usefully serves to prevent paint from sticking to a substrate and which may be readily removed using water under pressure.

These and other objects and advantages will become more apparent from the following more detailed description of the present invention.

DETAILED DESCRIPTION OF THE PRESENT INVENTION

In practice of the present invention, the several ingredients are combined in any convenient order to produce a blend of uniform consistency which is then applied to a substrate such as a spray booth. The present repellent paint composition may be applied to most any substrate including glass, wood, chrome, nickel, plastic and the like, textile materials being a notable exception. Application of the present repellent paint composition will retard adherence of paint to those surface areas to which it is applied. Application may be by any suitable means including such as for example, by rolling, spraying, or brush. When paint build-up results, removal may be effected by spray washing, wiping by means of a damp cloth or simply by rinsing with tap water under normal pressure. The heavy liquid hydrocarbons or lube oil operable is any hydrocarbon oil available commercially, having a viscosity minimum of about 40 Saybolt Universal Seconds (S.U.S.), as measured on the Saybolt viscometer, using ASTM method D88-53. There is no necessary viscosity maximum, as long as the oil is still liquid, at room temperature, about 1 S.U.S. I have found that a lube oil of viscosity 100 S.U.S. is quite suitable. The operable range of lube oil in the composition is up to 25 parts by weight, and preferably 18 to 22 parts by weight. The thickness of the oil gives body to the finished product.

Aluminum silicate is added in most any amount between about 50 to 70 parts by weight and preferably about 58 to 62 parts by weight. The aluminum silicate serves several useful functions in the repellent paint composition of the present invention including thickening of the composition, and as an absorbant in the finally prepared blend.

Sodium chloride, common salt, is added in an amount from about 1 to 5 parts by weight, and preferably from about 2 to 4 parts by weight.

Silicon dioxide or sand of small particle size is usefully added in an amount from about 5 to 15 parts by weight.

Sucrose, common sugar, is added in an amount from about 1 to 5 parts by weight and preferably from about 1 to 3 parts by weight.

Acetic acid is added usefully in an amount from about 2 to 8 parts by weight and desirably from about 4 to 6 parts by weight.

EXAMPLE I

In this example all parts are by weight unless otherwise specified.

The following ingredients were placed in a reaction vessel and blended to a uniform consistency:

| Ingredient | Parts by Weight |
|---|---|
| Mixture of Heavy Liquid Hydrocarbons (Burnt motor/engine oil) | 20 |
| Sodium Chloride | 3 |
| Sucrose | 2 |
| Aluminum Silicate | 60 |
| Silicon Dioxide | 10 |
| Acetic acid | 5 |

The blended composition has the general appearance and consistency of commercial paints. This preparation was easily applied to paint spray booth walls using conventional techniques. After normal use of the booth, the coating, including deposited spray paints was washed off the booth by directing a hose of hot water and steam against the material. Cold water under pressure can be used, if desired, although it has been found that hot water or steam is more efficient. The preparation is such that it may be said to be, in this regard, water soluble, this term being used to indicate that water will lessen its adhesive qualities sufficiently to effect its removal from the surfaces upon which it may be applied.

It will be apparent to those skilled in the art that many modifications and variations can be herein without departing from the invention which is disclosed and claimed.

What is claimed is:

1. A paint repellent composition which comprises, from about 15 to 25 parts by weight of a liquid hydrocarbon oil, from about 1 to 5 parts by weight of sucrose, from about 5 to 15 parts by weight silicon dioxide, from about 2 to 8 parts by weight acetic acid, from about 1 to 5 parts by weight sodium chloride, and from about 50 to 70 parts by weight aluminum silicate.

2. The paint repellent composition of claim 1 wherein the liquid hydrocarbon oil is present in an amount from about 18 to 22 parts by weight, the sucrose is present from about 1 to 3 parts by weight, the silicon dioxide is present in an amount from about 8 to 12 parts by weight, the acetic acid is present from about 4 to 6 parts by weight, the sodium chloride is present in an amount from about 2 to 4 parts by weight, and the aluminum silicate is present in an amount from about 58 to 62 parts by weight.

3. A method for repelling paint which comprises, applying a uniform blend of the composition of claim 1 to a substrate, and removing the applied composition when paint build-up is effected.

4. A method for repelling paint which comprises, applying a uniform blend of the composition of claim 2 to a substrate, and removing the applied composition when paint build-up is effected.

* * * * *